(12) United States Patent
Malabarba

(10) Patent No.: US 11,195,006 B2
(45) Date of Patent: Dec. 7, 2021

(54) MULTI-MODAL DOCUMENT FEATURE EXTRACTION

(71) Applicant: INTERNATIONAL BUSINESS MACHINES CORPORATION, Armonk, NY (US)

(72) Inventor: Scott Malabarba, Huntington Beach, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 104 days.

(21) Appl. No.: 16/212,007

(22) Filed: Dec. 6, 2018

(65) Prior Publication Data
US 2020/0184210 A1    Jun. 11, 2020

(51) Int. Cl.
*G06K 9/00* (2006.01)
*G06K 9/62* (2006.01)

(52) U.S. Cl.
CPC ....... *G06K 9/00469* (2013.01); *G06K 9/6219* (2013.01); *G06K 9/6256* (2013.01); *G06K 9/6263* (2013.01); *G06K 2209/01* (2013.01)

(58) Field of Classification Search
CPC ........ G06N 20/00; G06N 3/0454; G06N 3/08; G06N 3/0427; G06N 3/0445; G06N 5/003; G06N 5/022; G06N 3/049; G06N 3/082; G06N 5/046; G06N 7/005; G06T 7/11; G06T 11/60; G06T 2207/10016; G06T 2207/20016; G06T 2207/20092; G06T 2207/20104; G06T 7/12; G06T 7/162;
(Continued)

(56) References Cited

U.S. PATENT DOCUMENTS 5,416,849 A   5/1995   Huang
7,149,347 B1  12/2006  Wnek
(Continued)

OTHER PUBLICATIONS

F. Esposito, et al., "An experimental page layout recognition system for office document automatic classification: an integrated approach for inductive generalization," [1999] Proceedings. 10th International Conference on Pattern Recognition, Atlantic City, NJ, USA, 1990, pp. 557-562 vol. 1.
(Continued)

*Primary Examiner* — Golam Sorowar
(74) *Attorney, Agent, or Firm* — F. Chau & Associates, LLC (57) ABSTRACT

Systems and methods are described for generating a machine learning model for multi-modal feature extraction. The method may include receiving a document in a digital format, where the digital format comprises text information and image information, performing a text extraction function on a first portion of the document to produce a set of text features, performing an image extraction function on a second portion of the document to produce a set of image features, generating a feature tree, wherein a plurality of nodes of the feature tree correspond to the set of text features and the set of image features, and generating an input vector for a machine learning model based on the feature tree. In some cases, the feature tree may be generated synthetically, or modified by a user prior to being converted into the input vector.

13 Claims, 8 Drawing Sheets

(58) Field of Classification Search
CPC ....... G06T 7/215; G06T 13/80; G06T 19/006;
G06T 1/0007; G06T 2207/10004; G06T
2207/30204; G06T 3/4046; G06T 5/009;
G06T 7/0004; G06T 7/248; G06F 16/316;
G06F 16/41; G06F 16/7837; G06F
16/7867; G06F 16/81; G06F 40/106;
G06F 40/186; G06F 16/901; G06F 40/14;
G06F 40/166; G06F 40/30; G06F
16/2246; G06F 16/2456; G06F 16/288;
G06F 16/30; G06F 16/374; G06F
16/4393; G06F 16/532; G06F 16/5838;
G06K 9/00718; G06K 9/46; G06K
9/00456; G06K 9/6232; G06K
2009/3291; G06K 2209/01; G06K
9/00201; G06K 9/00315; G06K 9/00375;
G06K 9/00463; G06K 9/00671; G06K
9/036; G06K 9/2054; G06K 9/22; G06K
9/325; G06K 9/3258
See application file for complete search history.

(56) References Cited

U.S. PATENT DOCUMENTS

| | | | | |
|---|---|---|---|---|
| 2011/0158533 | A1* | 6/2011 | Gutelzon | G06K 9/4638 382/176 |
| 2015/0007005 | A1* | 1/2015 | Edge | G06F 40/166 715/205 |
| 2015/0178786 | A1* | 6/2015 | Claessens | G06Q 30/0269 705/14.66 |
| 2016/0371312 | A1* | 12/2016 | Ben-Aharon | G06F 40/14 |
| 2017/0168996 | A1* | 6/2017 | Dou | G06F 16/9577 |
| 2017/0255611 | A1* | 9/2017 | Kubosawa | G06F 40/205 |
| 2018/0108101 | A1 | 4/2018 | Rodriguez et al. | |
| 2019/0294921 | A1* | 9/2019 | Kalenkov | G06K 9/00201 |
| 2019/0311301 | A1* | 10/2019 | Pyati | G06F 16/901 |

OTHER PUBLICATIONS

F. Esposito, et al. (2008) "Machine Learning for Digital Document Processing: from Layout Analysis to Metadata Extraction." In: Marinai S., Fujisawa H. (eds) Machine Learning in Document Analysis and Recognition. Studies in Computational Intelligence, vol. 90. Springer, Berlin, Heidelberg.

M. Zeni, et al., "Extracting information from newspaper archives in Africa," in IBM Journal of Research and Development, vol. 61, No. 6, p. 12:1-12:12, Nov. 1-Dec. 2017.

L. Golebiowski, 2004. "Automated layout recognition." In Proceedings of the 1st ACM workshop on Hardcopy-document processing (HDP '04). ACM, New York, NY, USA, 41-46.

M. Baechler, et al., "Multi Resolution Layout Analysis of Medieval Manuscripts Using Dynamic MLP," 2011 International Conference on Document Analysis and Recognition, Beijing, 2011, pp. 1185-1189.

K. Iwane, et al., "A functional classification approach to layout analysis of document images," Proceedings of 2nd International Conference on Document Analysis and Recognition (ICDAR '93), Tsukuba Science City, Japan, 1993, pp. 778-78.

* cited by examiner

```
--TTTTTTTTTTTTTTTTTTTTTTTTTTTTTTTTTTTTTT/
--TTTTTTTTTTTTTTTTTTTTTTTTTTTTTTTTTTTTTT/
--TTTTTTTTTTTTTTTTTTTTTTTTTTTTTTTTTTTTTT/
--TTTTTTTTTTTTTTTTTTTTTTTTTTTTTTTTTTTTTT/
----------------------------------------/
----------------------------------------/
--IIIIIIIIIIII---TTTTTTTTTTTTT----------/
--IFFFFFFFFFFI---TTTTTTTTTTTTT----------/
--FFFFFFFFFFFF---AAAAAAAAAAAA-----------/
--FFEEEFNFEEEFF---AAAAAAAAAAAA----------/
--FFEEENNNEEEFF---AAAAAAAAAAAA----------/
--FFFFFNNNFFFFF---DDDDDDDDDDDD----------/
--FFFMMMMMMFFF---DDDDDDDDDDDD-----------/
--FFFMMMMMMFFF--------------------------/
--IFFFFFFFFFFI---TTTTTTTTTTTTT----------/
--IFFFFFFFFFFI---TTTTTTTTTTTTT----------/
----------------------------------------/
----------------------------------------/
------------------TTTTTTTTTTTT----------/
------------------TTTTTTTTTTTT-----IIIII--/
------------------TTTTTTTTTTTT-----IIIII--/
-------------------------------IIIII--/
----------------------------------------/
```

| Face | eyeR | eyeL | mth | nose | bar-code | add | date | Text CA | Text Driv. | Text Lic. | Pos. 0,0 | Pos. 0,1 | Pos. 0,2 | ... | Pos. 9,4 |
|---|---|---|---|---|---|---|---|---|---|---|---|---|---|---|---|
| 1 | 1 | 1 | 1 | 1 | 0 | 1 | 1 | 0 | 1 | 1 | T | T | T | ... | F |

| Sample 1 | Sample 2 | Sample 3 | Sample 4 | Layout |
|---|---|---|---|---|
| ------- | --TT--- | --TT--- | --TT--- | --TT--- |
| F--AA-- | F--AA-- | F--AA-- | F------ | F--AA-- |
| F--DD-- | F--DD-- | F--DD-- | F--TT-- | F--TT-- |
| F--TT-- | F--TT-- | ---TT-- | F--TT-- | F--TT-- |
| -----T- | --TT--- | ------- | ------- | ------- |

MULTI-MODAL DOCUMENT FEATURE EXTRACTION

TECHNICAL FIELD

The following relates generally to document feature extraction, and more specifically to generating a machine learning model for multi-modal feature extraction.

BACKGROUND

Enterprises typically require the collection of certain documents from their end users or customers for validation. These documents required may depend on circumstances. In one example, a financial institution may request a photo identification card and a proof of residency from an end user in a situation where a loan application is processed. Once requested, an end user may submit the documents to the enterprise for validation. During the validation of the document, machine-learning tools may be used to assist in validating the document (e.g. to determine whether the document provided by the end user a usable instance of the type of document requested).

The plurality of documents that end users submit to an enterprise may be inconsistent. For instance, if electronically submitted, the electronic file type, quality of the file or image, resolution of the file or image, and type of document can potentially vary. This variability in the document may be a result of the circumstance, type of document, and the end user. The information contained on the document may include fields, labels, and the like that are text- or language-based features, as well as graphically identifiable information such as headers, images, and logos. The variability and inconsistency in the documents submitted makes it challenging, and potentially inefficient, for machine learning models to detect, categorize, validate, and otherwise extract information from the varying documents in a consistent manner. For example, training a machine learning model to identify and extract information form the documents may require a large training set. Additionally, certain types of documents may be rare, or seldom available. The lack of availability of these documents makes it challenging to efficiently detect, categorize, and validate certain rare documents.

SUMMARY

A method for generating a machine learning model for multi-modal feature extraction is described. The method may include receiving a document in a digital format, wherein the digital format comprises text information and image information, performing a text extraction function on a first portion of the document to produce a set of text features, performing an image extraction function on a second portion of the document to produce a set of image features, generating a feature tree, wherein a plurality of nodes of the feature tree correspond to the set of text features and the set of image features, and generating an input vector for a machine learning model based at least in part on the feature tree.

An apparatus for document feature extraction is described. The apparatus may include a processor, memory in electronic communication with the processor, and instructions stored in the memory. The instructions may be operable to cause the processor to receive a document in a digital format, wherein the digital format comprises text information and image information, perform a text extraction function on a first portion of the document to produce a set of text features, perform an image extraction function on a second portion of the document to produce a set of image features, generate a feature tree, wherein a plurality of nodes of the feature tree correspond to the set of text features and the set of image features, and generate an input vector for a machine learning model based at least in part on the feature tree.

A non-transitory computer readable medium storing code for document feature extraction is described. In some examples, the code comprises instructions executable by a processor to: receive a document in a digital format, wherein the digital format comprises text information and image information, perform a text extraction function on a first portion of the document to produce a set of text features, perform an image extraction function on a second portion of the document to produce a set of image features, generate a feature tree, wherein a plurality of nodes of the feature tree correspond to the set of text features and the set of image features, and generate an input vector for a machine learning model based at least in part on the feature tree.

Some examples of the method, apparatus, and computer readable medium described above may further include identifying one or more child text features from the set of text features using a text refinement function, and one or more child image features from the set of image features using an image refinement function, wherein additional nodes of the feature tree correspond to the child text features and the child image features.

In some examples of the method, apparatus, and computer readable medium described above, each node of the feature tree comprises a zone including position information and size information.

Some examples of the method, apparatus, and computer readable medium described above may further include generating a document matrix based on the feature tree, wherein each element of the document matrix corresponds a location within one or more of the zones, wherein the input vector is based on the document matrix.

Some examples of the method, apparatus, and computer readable medium described above may further include identifying two or more features from the set of text features and the set of image features corresponding to the location. Some examples of the method, apparatus, and computer readable medium described above may further include identifying a feature type for each of the two or more features. Some examples of the method, apparatus, and computer readable medium described above may further include identifying a feature weight for each of the identified feature types. Some examples of the method, apparatus, and computer readable medium described above may further include selecting a single feature from the two or more features based on a comparison of the feature weights, wherein an element of the document is based on the selected single feature.

In some examples of the method, apparatus, and computer readable medium described above, the input vector is based on a linear transformation of the document matrix. Some examples of the method, apparatus, and computer readable medium described above may further include generating a document layout based at least in part on the document matrix.

Some examples of the method, apparatus, and computer readable medium described above may further include identifying a document type of a subsequent document based at least in part on the document layout. Some examples of the method, apparatus, and computer readable medium described above may further include performing the text extraction function or the image extraction function on one or more portions a subsequent document based at least in part on the document layout. Some examples of the method, apparatus, and computer readable medium described above may further include training the machine learning model based at least in part on the input vector.

Some examples of the method, apparatus, and computer readable medium described above may further include generating a synthetic feature tree, wherein the synthetic feature tree corresponds to a feature set of a hypothetical document. Some examples of the method, apparatus, and computer readable medium described above may further include generating a synthetic input vector based at least in part on the synthetic feature tree. Some examples of the method, apparatus, and computer readable medium described above may further include training the machine learning model using the synthetic input vector.

Some examples of the method, apparatus, and computer readable medium described above may further include displaying the feature tree to a user. Some examples of the method, apparatus, and computer readable medium described above may further include modifying the feature tree based on feedback from the user, wherein the input vector is generated based on the modified feature tree.

Some examples of the method, apparatus, and computer readable medium described above may further include receiving a subsequent document in a subsequent digital format, wherein the subsequent digital format is different from the digital format. Some examples of the method, apparatus, and computer readable medium described above may further include generating a subsequent feature tree from the subsequent document, wherein the subsequent feature tree has a same format as the feature tree. Some examples of the method, apparatus, and computer readable medium described above may further include generating a subsequent input vector based on the subsequent feature tree.

Some examples of the method, apparatus, and computer readable medium described above may further include extracting information from the document by applying the machine learning model to the input vector.

A method for generating a machine learning model for multi-modal feature extraction is described. The method may include performing a plurality of feature extraction functions on an incoming document to extract a set of features, wherein each feature extraction function returns a subset of the set of features and wherein each subset is associated with one of a plurality of zones, refining each of the plurality of zones based on one or more context-specific configurations to create a plurality of child features having a parent feature from the set of features, and normalizing the set features into a common schema having a tree structure, wherein a root node of the tree structure is a document, additional nodes of the tree structure comprise the set of features and the plurality of child features.

An apparatus for document feature extraction is described. The apparatus may include a processor, memory in electronic communication with the processor, and instructions stored in the memory. The instructions may be operable to cause the processor to perform a plurality of feature extraction functions on an incoming document to extract a set of features, wherein each feature extraction function returns a subset of the set of features and wherein each subset is associated with one of a plurality of zones, refine each of the plurality of zones based on one or more context-specific configurations to create a plurality of child features having a parent feature from the set of features, and normalize the set features into a common schema having a tree structure, wherein a root node of the tree structure is a document, additional nodes of the tree structure comprise the set of features and the plurality of child features.

A non-transitory computer readable medium storing code for document feature extraction is described. In some examples, the code comprises instructions executable by a processor to: perform a plurality of feature extraction functions on an incoming document to extract a set of features, wherein each feature extraction function returns a subset of the set of features and wherein each subset is associated with one of a plurality of zones, refine each of the plurality of zones based on one or more context-specific configurations to create a plurality of child features having a parent feature from the set of features, and normalize the set features into a common schema having a tree structure, wherein a root node of the tree structure is a document, additional nodes of the tree structure comprise the set of features and the plurality of child features.

Some examples of the method, apparatus, and computer readable medium described above may further include generating a subsequent tree structure for a subsequent document having a second document format that is different from a first document format of the incoming document. Some examples of the method, apparatus, and computer readable medium described above may further include training a machine learning model using the incoming document, wherein the subsequent tree structure is generated based on the training.

In some examples of the method, apparatus, and computer readable medium described above, the first document format comprises a text format and the second document format comprises an image format. In some examples of the method, apparatus, and computer readable medium described above, the set of features comprises one or more optical character recognition (OCR) features, face detection features, edge detection features, corner detection features, known images features, logo detection features, or any combination thereof.

In some examples of the method, apparatus, and computer readable medium described above, each of the plurality of zones is tagged with a one from a set of feature types comprising a face type, a text type, and an edge type. In some examples of the method, apparatus, and computer readable medium described above, each context-specific configuration is associated with a feature type.

Some examples of the method, apparatus, and computer readable medium described above may further include determining that a zone of the plurality of zones has a text type, wherein refining the zone comprises breaking the zone into a plurality of subzones based on line separation. Some examples of the method, apparatus, and computer readable medium described above may further include assigning a specific tags to each of the subzones based on regular expression matching. In some examples of the method, apparatus, and computer readable medium described above, each of the plurality of zones comprises position information and size information.

A method is described. The method may include determining that a training set for a machine learning model is below a threshold size, performing a first feature extraction function and a second feature extraction function on each document in the training set based on the determination, wherein the first feature extraction function and the second feature extraction function are configured to extract different types of features, generating, for each of the documents in the training set, a feature tree including features extracted using the first feature extraction function and the second feature extraction function, generating, for each of the documents in the training set, an input vector based on the feature tree, and training the machine learning model using the input vectors generated for each of the documents in the training set.

DETAILED DESCRIPTION

Convolutional neural networks (CNNs) and other machine learning models are generally considered to be the most powerful solution available today for implementing classifiers on general image features. In general image classification, the features that are extracted are generic, for example, relating to features of the image such as color gradients. For robust classification, hundreds of training images are typically required. However, for some document types, classification may not be performed or difficult to perform because of the lack of available training samples. Some document types may have sensitive information, which makes it challenging to acquire these samples from users (e.g. State driver's licenses).

There are also purely text or language-based feature extraction methods. A common example is a spam filter. Spam filters use well-established methods for extracting features from a text body based on relative word frequency. However, spam filters use only raw text, and in many cases do not take into account the layout of the document. Therefore, it may be difficult for spam filters to assist with text or data extraction. Thus, spam filters could easily misclassify similar documents of different types. Pure text-based classification may not be able to, for example, differentiate between financial statements for two different utility companies that include the same boilerplate text but completely different branding and layout.

There are also generalized image feature extraction engines. However, there are limitations associated with such engines. Results of generalized image feature extraction engines commonly output features and models that are opaque to the developer, i.e. not all information may be extracted and outputted, resulting in the developer missing certain information after extraction. In certain situations, there is difficulty in tuning generalized image feature extraction engines. For instance, when classifying state driver's licenses, the name of the state located on the driver's license is important. In the case of a driver's license issued by the State of California, the word California at the top left of the document is a feature that would need to be recognized by the generalized image feature extraction engine. However, the font type, size, and other visual characteristics of the word California may be variable. This variability may be due to, for example, the State of California issuing different versions of the driver's licenses over time. A possible limitation, therefore, is that in order for the generalized image classification engine to correctly recognize the document, many sample images would be required. A generalized image classification engine may also require that the corresponding features be assigned varying weights or importance.

Additionally, there may be other challenges associated with an image-based generalized image feature extraction engines. In some cases, the algorithm may not be useable for documents in certain formats (e.g. PDF). General image classification solutions may also embed any knowledge about the features extracted in the CNN itself. The structure of the CNN may be opaque to the developer (i.e., the person training or using the CNN). In other words, the knowledge may only be useful only within the context of the neural network and cannot be leveraged elsewhere.

Certain embodiments of the invention include a system, method, and apparatus that analyzes incoming documents of multiple types, and extracts features of known interest. These features include, for example, faces, edges, text content, images, logos, and positions of such features in the documents. Certain steps associated with the system, method, and apparatus further include refining these features based on context-specific configurations. The features are re-formatted into a positional matrix. From the positional matrix, and additional feature manipulations, a linear input vector that can be formatted as a machine learning data point is produced.

The resulting data point contains features that have been cleaned and compressed and encode the developer's knowledge about the problem domain. Similarly formatted data points are then used to train a machine-learning model to classify incoming documents.

Compared to traditional approaches, the system, method, and apparatus found in certain embodiments of the invention produces data points that contain denser information specific to the problem domain, which allows a developer to train a classification model with a smaller data set. In other words, the fewer sample images would be required to train a machine-learning model.

Compared to traditional approaches, the system, method, and apparatus found in certain embodiments of the invention supports handling multiple document types with a single classification model. The feature extraction process may differ between file types (e.g. an image file compared with a PDF), but the resulting data points will be in the same format.

Finally, the system, method, and apparatus found in certain embodiments of the invention produces an abstract layout for each document processed. These layouts can be aggregated to deduce a footprint characteristic of the document type in question. The known layout can, in turn, be fed back into the feature extraction process at runtime to improve results.

For example, in certain embodiments, optical character recognition (OCR) quality and speed can be significantly improved by feeding zonal information to the OCR engine, and allowing the OCR engine to examine only small portions of the image that are known to contain text. Normally, this poses a chicken-and-egg problem: how is the location of the text identified until after the information is extracted? Traditional capture solutions require a developer to manually specify the layout for each type of document. This method does not scale well in a cloud scenario, where customers with new requirements are brought on board quickly.

However, with the system, method, and apparatus found in certain embodiments of the invention, the document layout is deduced during training. When classification is requested for a particular document type, the invention can pass this layout information directly to the OCR engine to process only those regions of the image that may have relevant text (other text outside the layout of the document type in question is not relevant and need not be extracted).

There are additional advantages of this multi-modal approach, where the training data points have richer feature data available. Having richer feature data available improves processing of weaker data points. For instance, during training, bank statements may be submitted in PDF form, while an end user may submit bank statements in image form (using scans, or mobile phone camera photographs) during runtime. Because text-based extraction from PDFs is much more reliable than OCR, text zones can be stored during training, and used to tune OCR on images submitted for classification at runtime.

It will be appreciated that certain embodiments are used to analyze, classify, and extract information from formatted documents. It will be appreciated that the solutions presented in certain embodiments are ideal for handling various types of documents, including, but not limited checks, invoices, and IDs. It will be appreciated that open source libraries for machine learning may include certain embodiments of the invention in their feature extraction components.

Figure 1:
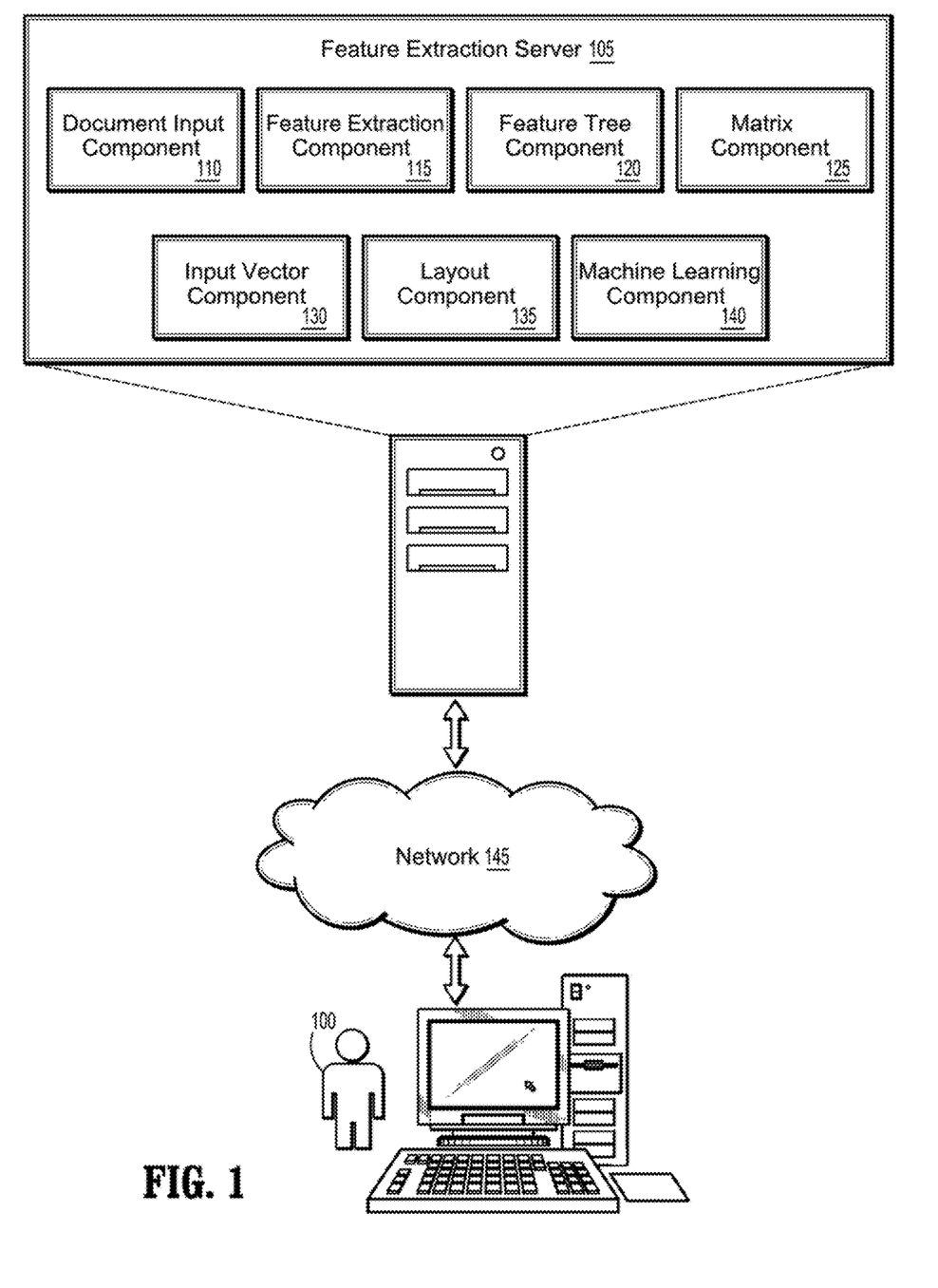
FIG. 1 shows an example of a feature extraction system in accordance with aspects of the present disclosure.

FIG. 1 shows an example of a feature extraction system in accordance with aspects of the present disclosure. The example shown includes user 100, feature extraction server 105, and network 145. The example of a feature extraction system illustrated in FIG. 1 is only one example of the architecture of such a system. For example, in some cases the feature extraction functions may operate from within the computing device of the user 100. In other examples, training of a machine learning model may be accomplished on a separate device from the device that actually performs feature extraction of new documents.

Feature extraction server 105 may include document input component 110, feature extraction component 115, feature tree component 120, matrix component 125, input vector component 130, layout component 135, and machine learning component 140.

The feature extraction component 115 runs a series of feature extraction functions on a document submitted via the document input component 110. The feature extraction component 115 may include a text extraction function and image extraction function. For example, a feature extraction function may perform optical character recognition (OCR), face detection, edge and corner detection, or detection of known images or logos on the image. It will be appreciated that the details of feature extraction are known to those skilled in the art, and will typically include existing techniques, libraries and services.

The feature extraction component 115 extracts text information from a submitted document to identify a text feature, and extracts image information from a submitted document to identify an image feature. The feature extraction component 115 outputs a list of features detected from the document, and organizes the features into zones with coordinates and size. Each zone is tagged with a type (face, text, edge, etc.). For example, a zone might consist of a "face" at x=10, y=10 with height=50 and width=35.

The feature tree component 120 takes the list of features outputs features into a common schema and structured into a tree, after normalization. The structure of the tree is such that the broadest information (i.e. the "root") is the entire document, and the narrowest information (i.e. the "leaves") are the smallest features. The feature tree component 120 may also define location zones. The zones are refined based on context-specific configuration. For example, text zones can be broken apart into smaller, more specific zones based on line separation. Text zones can be assigned more specific tags based on regular expression matching to create feature tags such as date, zip code, or SSN.

The matrix component 125 generates a matrix using data from the feature tree. The matrix serves as an abstraction of the features in the image that are relevant to the problem domain. Thus, the machine learning model may be trained using a smaller, more relevant data set.

In some cases, the feature extraction server 105 may determine the presence or absence of certain features in a document are of particular importance in the problem domain. In certain embodiments, developers may configure the feature extraction to determine whether those are features that require attention. For example, the presence of a face anywhere on an image, or one of the words CA, California, driver, or license are all of particular significance when attempting to classify documents such as photo IDs.

The input vector component 130 takes the features from the document matrix, and forms a data point in vector form. The machine learning component 140 inputs the vector data point into a machine learning implementation. In certain embodiments, any machine learning implementation can be used. A set of similarly extracted and formatted data points are used to train and test machine learning. The data set is subjected to standard machine learning techniques, for example, by removing features with low variance.

It will be appreciated that compared to other methods that rely on generic image feature extraction, the data point has far fewer features overall. Moreover, the data point is more relevant to the problem domain, and thus, more useful when training a classification model. For example, using an input vector with fewer features (which are more relevant to the problem domain) may enable training a machine learning model (i.e., a CNN) with a smaller training set.

The document layout component 135 generates a common layout or footprint of the document type under analysis. Documents generated from a plurality of sample data points contain slightly different matrices as might result from, for example, the quality of the source image, the lengths of names, addresses and other variable attributes, and the exact format of the document (most US state driver's licenses, for example, change over time). After removing features with high variance, such as text blocks at the bottom, what is left is a common layout, or footprint, of the document type under analysis.

The common layout can then be fed back into the feature extraction pipeline for new incoming documents. The layout cells can be converted back into coordinates based on document dimensions and those coordinates then used to tune OCR or other feature extraction processes.

Thus, document input component 110 may receive a document in a digital format, wherein the digital format comprises text information and image information. Document input component 110 may also receive a subsequent document in a subsequent digital format, wherein the subsequent digital format is different from the digital format.

Feature extraction component 115 may perform a text extraction function on a first portion of the document to produce a set of text features. Feature extraction component 115 may also perform an image extraction function on a second portion of the document to produce a set of image features. Feature extraction component 115 may also perform the text extraction function or the image extraction function on one or more portions a subsequent document based at least in part on the document layout.

Feature extraction component 115 may perform a plurality of feature extraction functions on an incoming document to extract a set of features, wherein each feature extraction function returns a subset of the set of features and wherein each subset is associated with one of a plurality of zones. In some examples, the set of features comprises one or more OCR features, face detection features, edge detection features, corner detection features, known images features, logo detection features, or any combination thereof.

Feature tree component 120 may generate a feature tree, wherein a plurality of nodes of the feature tree correspond to the set of text features and the set of image features. Feature tree component 120 may also identify one or more child text features from the set of text features using a text refinement function, and one or more child image features from the set of image features using an image refinement function, wherein additional nodes of the feature tree correspond to the child text features and the child image features. In some examples, each node of the feature tree comprises a zone including position information and size information.

Feature tree component 120 may also generate a synthetic feature tree, wherein the synthetic feature tree corresponds to a feature set of a hypothetical document. Feature tree component 120 may also display the feature tree to a user 100. Feature tree component 120 may also modify the feature tree based on feedback from the user 100, wherein the input vector is generated based on the modified feature tree. Feature tree component 120 may also generate a subsequent feature tree from the subsequent document, wherein the subsequent feature tree has a same format as the feature tree.

Feature tree component 120 may refine each of the plurality of zones based on one or more context-specific configurations to create a plurality of child features having a parent feature from the set of features. Feature tree component 120 may also normalize the set features into a common schema having a tree structure, wherein a root node of the tree structure is a document, additional nodes of the tree structure comprise the set of features and the plurality of child features. Feature tree component 120 may also generate a subsequent tree structure for a subsequent document having a second document format that is different from a first document format of the incoming document.

In some examples, the first document format comprises a text format and the second document format comprises an image format. In some examples, each of the plurality of zones is tagged with a one from a set of feature types comprising a face type, a text type, and an edge type. In some examples, each context-specific configuration is associated with a feature type.

Feature tree component 120 may also determine that a zone of the plurality of zones has a text type, wherein refining the zone comprises breaking the zone into a plurality of subzones based on line separation. Feature tree component 120 may also assign a specific tags to each of the subzones based on regular expression matching. In some examples, each of the plurality of zones comprises position information and size information.

Matrix component 125 may generate a document matrix based on the feature tree, wherein each element of the document matrix corresponds a location within one or more of the zones, wherein the input vector is based on the document matrix. Matrix component 125 may also identity two or more features from the set of text features and the set of image features corresponding to the location. Matrix component 125 may also identify a feature type for each of the two or more features. Matrix component 125 may also identify a feature weight for each of the identified feature types. Matrix component 125 may also select a single feature from the two or more features based on a comparison of the feature weights, wherein an element of the document is based on the selected single feature.

Input vector component 130 may generate an input vector for a machine learning model based at least in part on the feature tree. In some examples, the input vector is based on a linear transformation of the document matrix. Input vector component 130 may also generate a synthetic input vector based at least in part on the synthetic feature tree. Input vector component 130 may also generate a subsequent input vector based on the subsequent feature tree.

Layout component 135 may generate a document layout based at least in part on the document matrix. Layout component 135 may also identify a document type of a subsequent document based at least in part on the document layout.

Machine learning component 140 may train the machine learning model based at least in part on the input vector. Machine learning component 140 may also train the machine learning model using the synthetic input vector. Machine learning component 140 may also extract information from the document by applying the machine learning model to the input vector. Machine learning component 140 may train a machine learning model using the incoming document, wherein the subsequent tree structure is generated based on the training.

Figure 2:
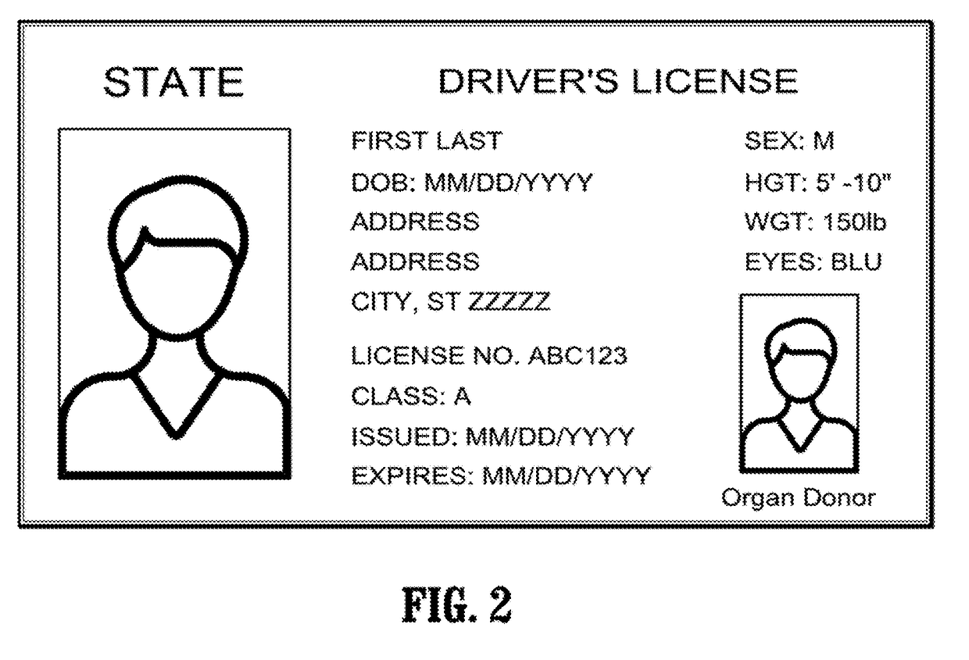
FIG. 2 shows an example of an identification document in accordance with aspects of the present disclosure.

FIG. 2 shows an example of an identification document 200 in accordance with aspects of the present disclosure. The feature extraction server described herein determines the type of document, and the information in the document, using the data from a feature matrix. For example, document 200 may represent a state driver's license, the feature extraction system described herein may transform document 200 into a document feature matrix using a predetermined document layout or footprint. The data in the matrix serves as an abstraction of the features in an image such as the identification document 200. In certain embodiments, the document matrix represents the common footprint or layout for the document type.

Figure 3:
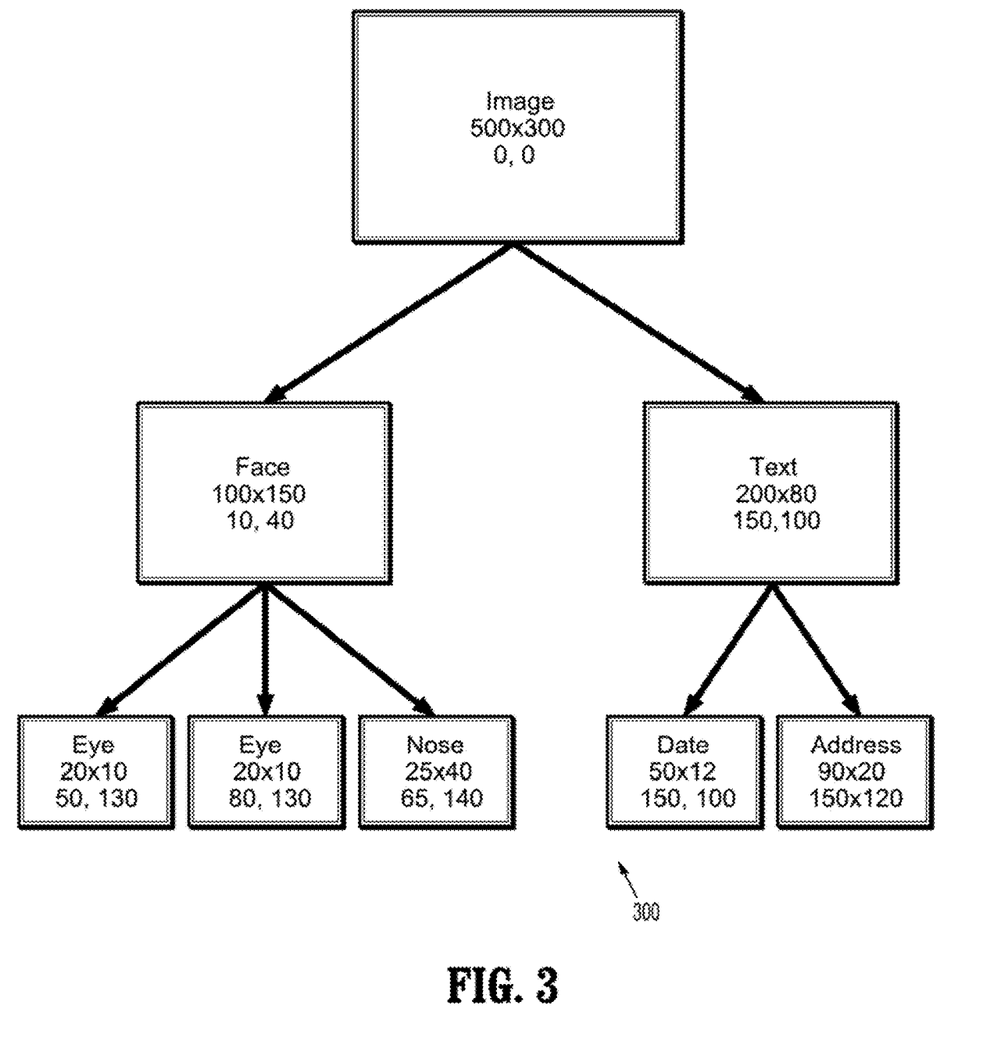
FIG. 3 shows an example of a feature tree in accordance with aspects of the present disclosure.

FIG. 3 shows an example of a feature tree 300 in accordance with aspects of the present disclosure. Features such as those of identification document 200 are normalized into a common schema and structured into a feature tree 300. The structure of the tree is such that the broadest information (i.e. the "root") is the entire document, and the narrowest information (i.e. the "leaves") are the smallest features extracted by refinement extraction functions (e.g., text-specific extraction functions, or facial recognition functions)

Each node has metadata indicating the zone type, the dimensions, and the location. Additional metadata may be attached, such extracted text. In some cases, zones associated with multiple nodes can overlap. Use of the feature tree 300 allows for very efficient and robust operations on the zone structure using well-established graph algorithms and libraries.

Figure 4:
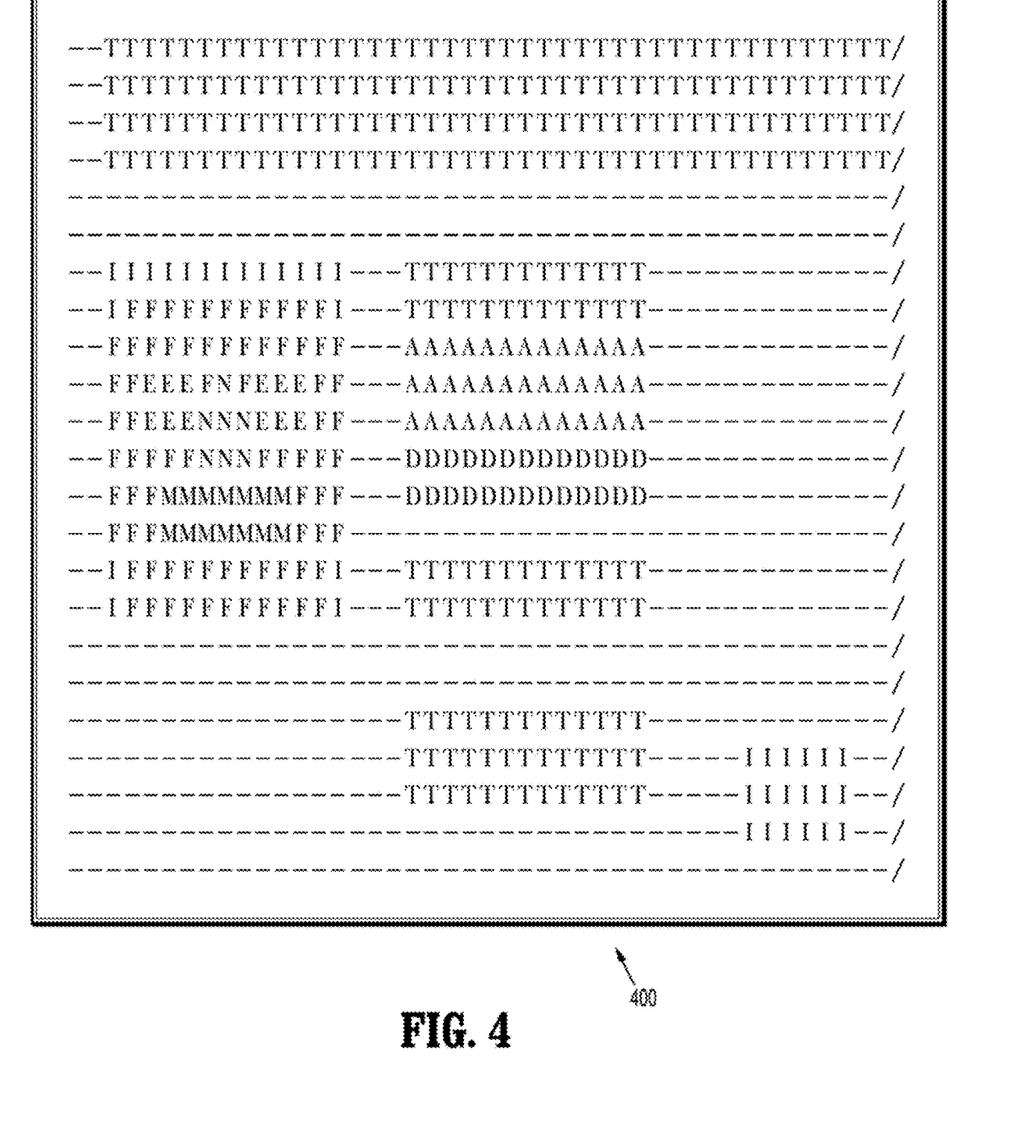
FIG. 4 shows an example of a document matrix in accordance with aspects of the present disclosure.

FIG. 4 shows an example of a document matrix 400 in accordance with aspects of the present disclosure. The matrix component described herein may generates a document matrix 400 using data from the feature extraction function, which may be organized into a feature tree. The document matrix 400 serves as an abstraction of the features in the image that are interesting for the problem domain. Single integers, encoded as characters, indicate the tags associated with each zone. For example, T indicates "text", F indicates "face" and A indicates "address".

In some cases, the multiple features may overlap. A user may identify weights for each feature type such that the matrix is generated using the feature having the highest feature weight, or priority. In one example of overlapping features, an eye may overlap with a face, which may overlap with an image. In this case, the eye feature may be given a higher weight than the face feature (or the image feature) because it includes more information. In other cases, the feature types are not easily nested, and the weights may represent the relative importance of certain types of information. For example, an address feature may be given more weight than an eye feature when they overlap.

In some cases, different samples of a document type under investigation will produce somewhat different matrices. However, all will have common elements. For example, any California driver's license will have a face in approximately the same location in the document matrix 400. Given a list of such matrices, features (or cells in the document matrix 400) with low variance can be extracted and used to deduce and record a layout for the document type, without human intervention.

Figure 5:
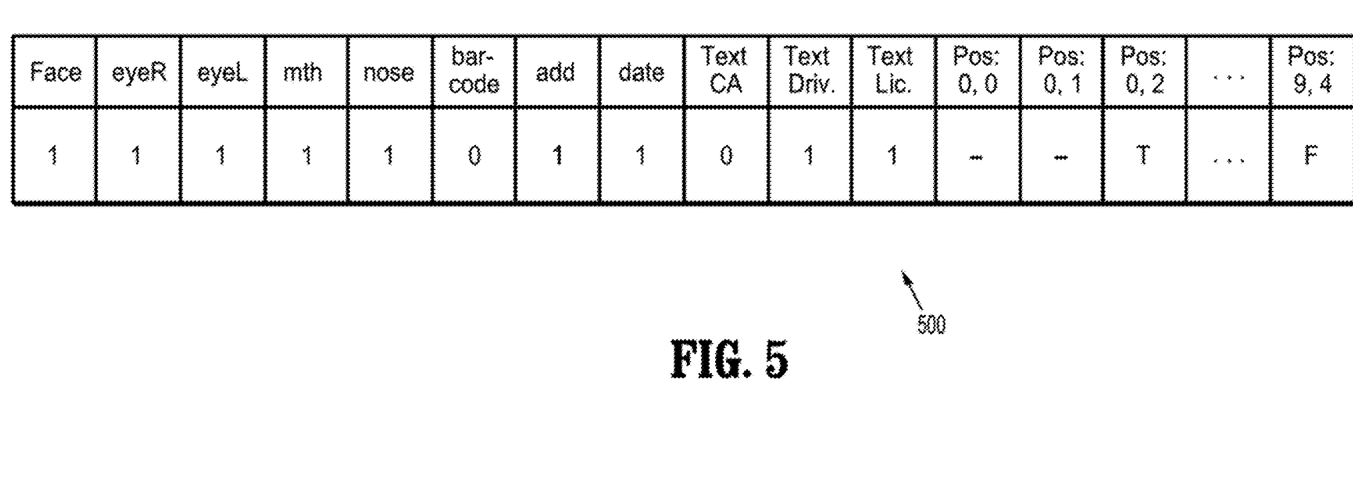
FIG. 5 shows an example of an input vector in accordance with aspects of the present disclosure.

FIG. 5 shows an example of an input vector 500 in accordance with aspects of the present disclosure. The input vector 500 component described herein may help determine whether the presence or absence of certain features in a document are of particular importance in the problem domain. Important features may then be determined from the document matrix and combined into a single input vector 500. The input vector may include generic information (i.e., whether the text "California" appears), as well as information associated with a specific location (i.e., what is the feature located at position (9,4).

In certain embodiments, users may configure the feature extraction to determine whether those are features that require attention. For example, the presence of a face anywhere on an image or one of the words CA, California, driver, or license are all of particular significance when attempting to classify documents such as photo IDs.

Thus, the input vector 500 combines the features from the configured feature extraction with the document matrix, and forms a data point in vector form. The vector may then be utilized by a machine learning component to extract important information from the document, or to classify the document.

Figure 6:
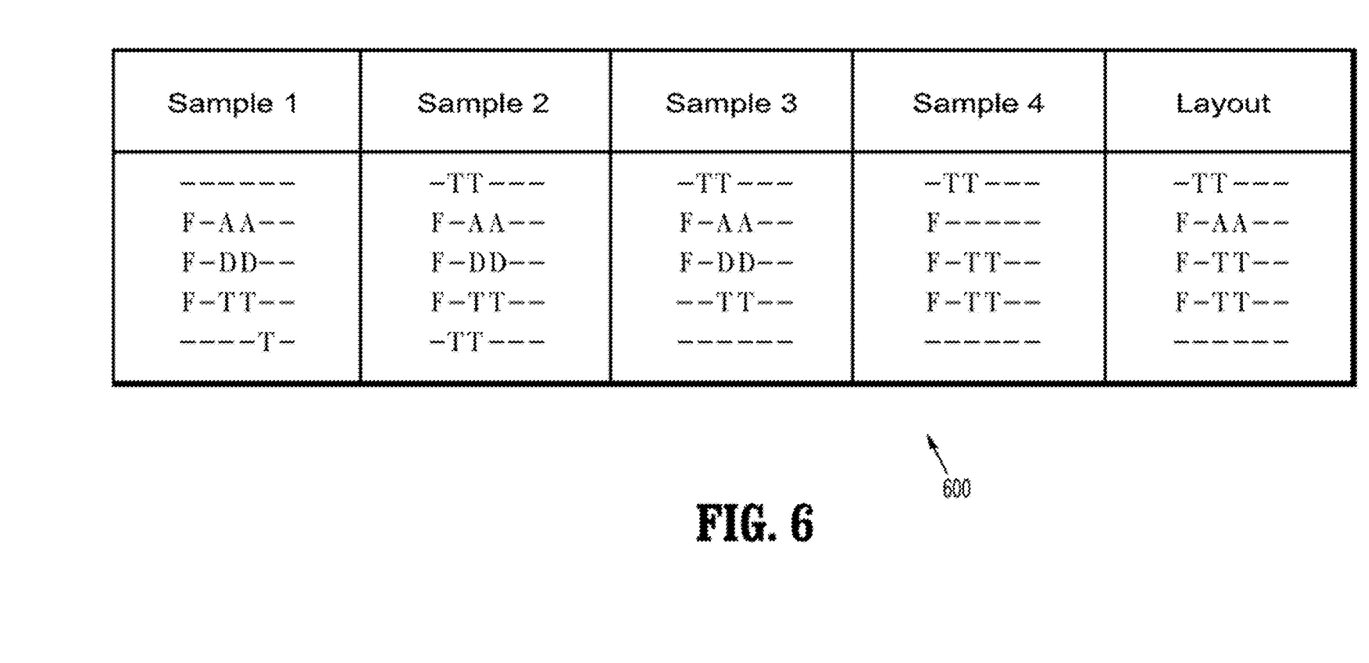
FIG. 6 shows an example of a set of document layouts in accordance with aspects of the present disclosure.

FIG. 6 shows an example of a set of document layouts 600 in accordance with aspects of the present disclosure. The machine learning component inputs the data point (i.e., the input vector) into a machine learning implementation. In certain embodiments, any machine learning implementation can be used. A set of similarly extracted and formatted data points are used to train and test machine learning. The data set is subjected to standard machine learning techniques, for example, by removing features with low variance. It will be appreciated that compared to other methods that rely on generic image feature extraction, the data point has far fewer features overall. Moreover, the data point is more relevant to the problem domain, and thus, more useful when training a classification model. That is, the data in the data point is configured to enable training of a machine learning model using a smaller training set.

In some cases, the machine learning component may also be used to generate one or more document layouts 600 or footprints of the document type under analysis. Documents generated from a plurality of sample data points contain slightly different matrices as might result from, for example, the quality of the source image, the lengths of names, addresses and other variable attributes, and the exact format of the document (most US state driver's licenses, for example, change over time). After removing features with high variance, such as text blocks at the bottom, what is left is a common layout, or footprint, of the document type under analysis.

The document layouts 600 can then be fed back into the feature extraction pipeline for new incoming documents. The layout cells can be converted back into coordinates based on document dimensions and those coordinates then used to tune OCR or other feature extraction processes.

Figure 7:
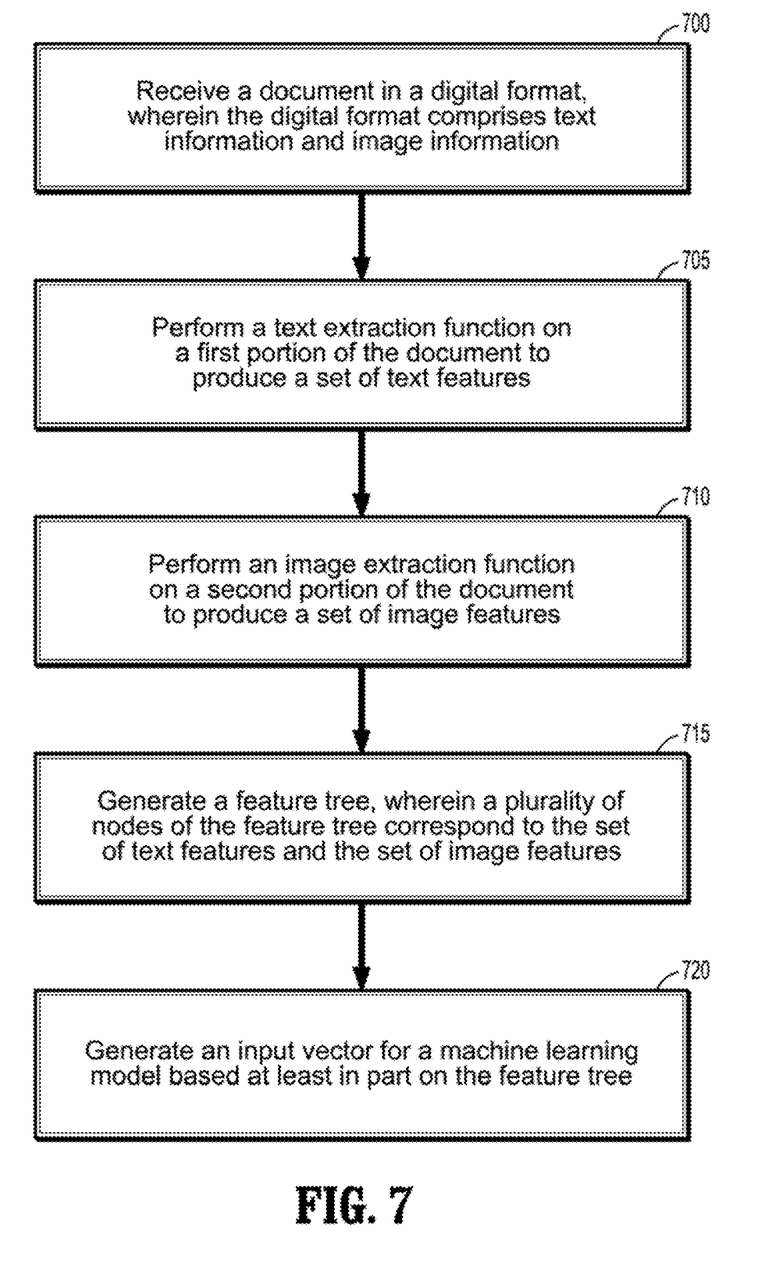
FIGS. 7 through 8 show examples of a machine learning process for feature extraction in accordance with aspects of the present disclosure.

FIG. 7 shows an example of a machine learning process for feature extraction in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At step 700, the system may receive a document in a digital format, wherein the digital format comprises text information and image information. In some cases, the operations of this step may refer to, or be performed by, a document input component as described with reference to FIG. 1.

At step 705, the system may perform a text extraction function on a first portion of the document to produce a set of text features. In some cases, the operations of this step may refer to, or be performed by, a feature extraction component as described with reference to FIG. 1.

At step 710, the system may perform an image extraction function on a second portion of the document to produce a set of image features. In some cases, the operations of this step may refer to, or be performed by, a feature extraction component as described with reference to FIG. 1.

At step 715, the system may generate a feature tree, wherein a plurality of nodes of the feature tree correspond to the set of text features and the set of image features. In some cases, the operations of this step may refer to, or be performed by, a feature tree component as described with reference to FIG. 1.

At step 720, the system may generate an input vector for a machine learning model based at least in part on the feature tree. In some cases, the operations of this step may refer to, or be performed by, an input vector component as described with reference to FIG. 1.

Figure 8:
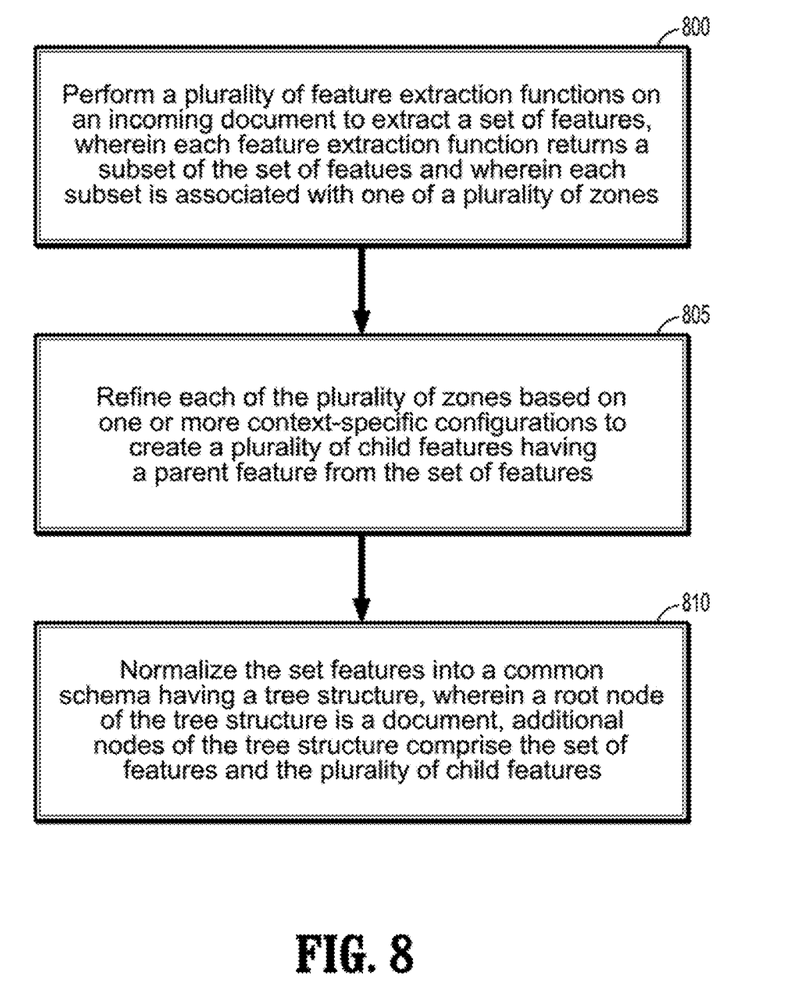

FIG. 8 shows an example of a machine learning process for feature extraction in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 800, the system may perform a plurality of feature extraction functions on an incoming document to extract a set of features, wherein each feature extraction function returns a subset of the set of features and wherein each subset is associated with one of a plurality of zones. In some cases, the operations of this step may refer to, or be performed by, a feature extraction component as described with reference to FIG. 1.

At step 805, the system may refine each of the plurality of zones based on one or more context-specific configurations to create a plurality of child features having a parent feature from the set of features. In some cases, the operations of this step may refer to, or be performed by, a feature tree component as described with reference to FIG. 1.

At step 810, the system may normalize the set features into a common schema having a tree structure, wherein a root node of the tree structure is a document, additional nodes of the tree structure comprise the set of features and the plurality of child features. In some cases, the operations of this step may refer to, or be performed by, a feature tree component as described with reference to FIG. 1.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on."

What is claimed is:

1. A method for document feature extraction, comprising:
receiving a document in a digital format, wherein the digital format comprises text information and image information;
performing a text extraction function on a first portion of the document to produce a set of text features;
performing an image extraction function on a second portion of the document to produce a set of image features;
generating a feature tree, wherein each of a plurality of nodes of the feature tree comprises a zone including position information, size information, and a zone type selected from the set of text features and the set of image features;
generating a document matrix based on the feature tree by associating each element of the document matrix with a zone type of a corresponding node of the feature tree based on the position information and the size information; and
generating an input vector for a machine learning model based at least in part on the document matrix.

2. The method of claim 1, further comprising:
identifying one or more child text features from the set of text features using a text refinement function, and one or more child image features from the set of image features using an image refinement function, wherein additional nodes of the feature tree correspond to the child text features and the child image features.

3. The method of claim 1, further comprising:
identifying two or more features from the set of text features and the set of image features corresponding to the location;
identifying a feature type for each of the two or more features;
identifying a feature weight for each of the identified feature types; and
selecting a single feature from the two or more features based on a comparison of the feature weights, wherein an element of the document is based on the selected single feature.

4. The method of claim 3, wherein the reduced number of features of the feature tree is based on the selected single feature and the input vector is based on a linear transformation of the document matrix.

5. The method of claim 1, further comprising:
generating a document layout based at least in part on the document matrix.

6. The method of claim 5, further comprising:
identifying a document type of a subsequent document based at least in part on the document layout.

7. The method of claim 5, further comprising:
performing the text extraction function or the image extraction function on one or more portions a subsequent document based at least in part on the document layout.

8. The method of claim 1, further comprising:
training the machine learning model based at least in part on the input vector.

9. The method of claim 1, further comprising:
generating a synthetic feature tree, wherein the synthetic feature tree corresponds to a feature set of a hypothetical document;
generating a synthetic input vector based at least in part on the synthetic feature tree; and
training the machine learning model using the synthetic input vector.

10. The method of claim 1, further comprising:
displaying the feature tree to a user; and
modifying the feature tree based on feedback from the user, wherein the input vector is generated based on the modified feature tree.

11. The method of claim 1, further comprising:
receiving a subsequent document in a subsequent digital format, wherein the subsequent digital format is different from the digital format;
generating a subsequent feature tree from the subsequent document, wherein the subsequent feature tree has a same format as the feature tree; and
generating a subsequent input vector based on the subsequent feature tree.

12. The method of claim 1, wherein the zone is tagged with a feature type from a set of feature types, the set of feature types comprising a face type, a text type, and an edge type.

13. A method for document feature extraction, comprising:
receiving a document in a digital format, wherein the digital format comprises text information and image information;
performing a text extraction function on a first portion of the document to produce a set of text features;
performing an image extraction function on a second portion of the document to produce a set of image features;
generating a feature tree, wherein a plurality of nodes of the feature tree correspond to the set of text features and the set of image features, and wherein each node of the feature tree comprises a zone including position information and size information;
generating a document matrix based on the feature tree, wherein each element of the document matrix corresponds to a location within one or more zones;
identifying two or more features from the set of text features and the set of image features corresponding to the location;
identifying a feature type for each of the two or more features;
identifying a feature weight for each of the identified feature types;
selecting a single feature from the two or more features based on a comparison of the feature weights, wherein an element of the document is based on the selected single feature; and
generating an input vector for a machine learning model based at least in part on a reduced number of features of the feature tree and the generated document matrix.

* * * * *